United States Patent
Hendry

(10) Patent No.: US 12,052,433 B2
(45) Date of Patent: *Jul. 30, 2024

(54) IMAGE ENCODING/DECODING METHOD AND DEVICE FOR SIGNALING INFORMATION RELATED TO SUB PICTURE AND PICTURE HEADER, AND METHOD FOR TRANSMITTING BITSTREAM

(71) Applicant: LG ELECTRONICS INC., Seoul (KR)

(72) Inventor: Hendry Hendry, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/227,267

(22) Filed: Jul. 27, 2023

(65) Prior Publication Data

US 2023/0370628 A1  Nov. 16, 2023

Related U.S. Application Data

(63) Continuation of application No. 17/863,215, filed on Jul. 12, 2022, now Pat. No. 11,758,172, which is a continuation of application No. PCT/KR2021/000515, filed on Jan. 14, 2021.

(60) Provisional application No. 62/961,188, filed on Jan. 14, 2020.

(51) Int. Cl.
*H04N 19/46* (2014.01)
*H04N 19/169* (2014.01)
*H04N 19/174* (2014.01)

(52) U.S. Cl.
CPC .......... *H04N 19/46* (2014.11); *H04N 19/174* (2014.11); *H04N 19/188* (2014.11)

(58) Field of Classification Search
CPC ..... H04N 19/46; H04N 19/174; H04N 19/188
See application file for complete search history.

(56) References Cited

PUBLICATIONS

Ling Li, et al., "AHG 9: On picture header", Joint Video Experts Team (JVET) of ITU-T SG 16 WP 3 and ISO/IEC JTC 1/SC 29/WG 11, 17th Meeting: Brussels, BE, Jan. 7-17, 2020. JVET-Q0419-v1.
(Continued)

*Primary Examiner* — On S Mung
(74) *Attorney, Agent, or Firm* — Bryan Cave Leighton Paisner LLP

(57) ABSTRACT

Disclosed herein are an image encoding and decoding method and apparatus for signaling information on a subpicture and picture header, and a method of transmitting a bitstream. The image decoding method according to the present disclosure may include acquiring a first flag specifying whether information on a subpicture is present in a bitstream, acquiring a second flag specifying whether picture header information is present in a slice header, and decoding the bitstream based on the first flag and the second flag. When the first flag specifies that the information on the subpicture is present in the bitstream, the second flag may have a value specifying that the picture header information is not present in the slice header.

14 Claims, 17 Drawing Sheets

(56) References Cited

PUBLICATIONS

Benjamin Bross, et al., "Versatile Video Coding (Draft 7)", Joint Video Experts Team (JVET) of ITU-T SG 16 WP 3 and ISO/IEC JTC 1/SC 29/WG 11, 16th Meeting: Geneva, CH, Oct. 1-11, 2019. JVET-P2001-vE.

Hendry, "AHG9: A summary of HLS contributions on picture header, slice header, and access unit delimiter", Joint Video Experts Team (JVET) of ITU-T SG 16 WP 3 and ISO/IEC JTC 1/SC 29/WG 11, 17th Meeting: Brussels, BE, Jan. 7-17, 2020. JVET-Q0684-v1.

FIG. 4
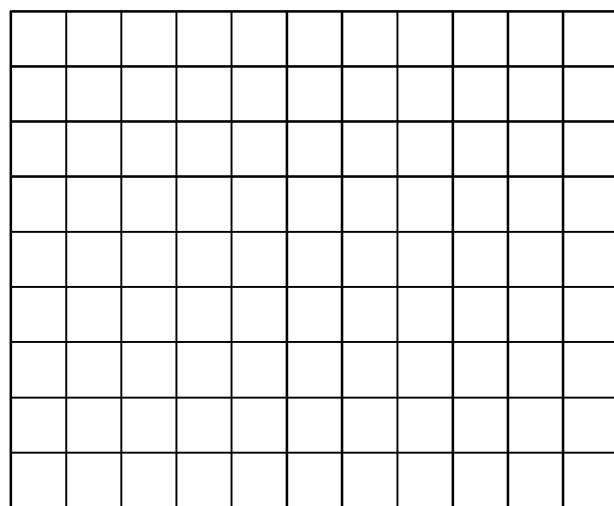
FIG. 5
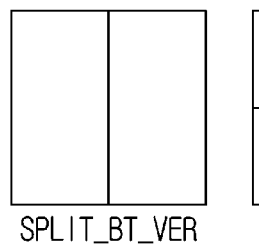 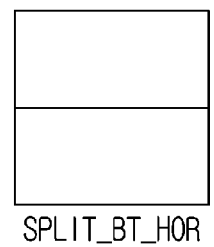 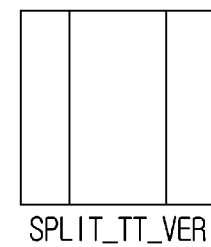 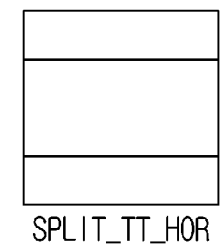
SPLIT_BT_VER   SPLIT_BT_HOR   SPLIT_TT_VER   SPLIT_TT_HOR

| picture_header_rbsp( ) { | Descriptor |
|---|---|
| non_reference_picture_flag | u(1) |
| gdr_pic_flag | u(1) |
| no_output_of_prior_pics_flag | u(1) |
| if( gdr_pic_flag ) | |
|    recovery_poc_cnt | ue(v) |
| ph_pic_parameter_set_id | ue(v) |
| ... | |
| } | |

FIG. 11

| slice_header( ) { | Descriptor |
|---|---|
|   picture_header_in_slice_header_flag | u(1) |
|   if(picture_header_in_slice_header_flag) | |
|     picture_header_structure( ) | |
|   if( subpics_present_flag ) | |
|     slice_subpic_id | u(v) |
|   if( rect_slice_flag \|\| NumTilesInPic > 1 ) | |
|     slice_address | u(v) |
|   if( !rect_slice_flag && NumTilesInPic > 1 ) | |
|     num_tiles_in_slice_minus1 | ue(v) |
|   ... | |
| } | |

FIG. 14

| slice_header( ) { | Descriptor |
|---|---|
| picture_header_in_slice_header_flag | u(1) |
| if(picture_header_in_slice_header_flag) | |
|   picture_header_structure( ) | |
| if( subpics_present_flag && !picture_header_in_slice_header_flag ) | |
|   slice_subpic_id | u(v) |
| if( ( rect_slice_flag \|\| NumTilesInPic > 1 ) && !picture_header_in_slice_header_flag ) | |
|   slice_address | u(v) |
| if( !rect_slice_flag && NumTilesInPic > 1 ) | |
|   num_tiles_in_slice_minus1 | ue(v) |
| ... | |
| } | |

FIG. 17

| slice_header( ) { | Descriptor |
|---|---|
|   if ( !subpics_present_flag) { | |
|   picture_header_in_slice_header_flag | u(1) |
|   if(picture_header_in_slice_header_flag) | |
|     picture_header_structure( ) | |
|   } else | |
|     slice_subpic_id | u(v) |
|   if( ( rect_slice_flag \|\| NumTilesInPic > 1 ) && !picture_header_in_slice_header_flag ) | |
|     slice_address | u(v) |
|   if( !rect_slice_flag && NumTilesInPic > 1 ) | |
|     num_tiles_in_slice_minus1 | ue(v) |
|   ... | |
| } | | ived 
IMAGE ENCODING/DECODING METHOD AND DEVICE FOR SIGNALING INFORMATION RELATED TO SUB PICTURE AND PICTURE HEADER, AND METHOD FOR TRANSMITTING BITSTREAM This application is a Continuation Application of U.S. patent application Ser. No. 17/863,215, filed on Jul. 12, 2022, which is a Continuation Application of International Application No. PCT/KR2021/000515, filed on Jan. 14, 2021, which claims the benefit of and priority to U.S. Provisional Application No. 62/961,188, filed on Jan. 14, 2020, the contents of which are all hereby incorporated by reference herein in their entirety.

TECHNICAL FIELD

The present disclosure relates to an image encoding/decoding method and apparatus, and, more particularly, to an image encoding and decoding method and apparatus for signaling information on a subpicture and picture header, and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus for improving encoding/decoding efficiency by efficiently signaling information on a subpicture and picture header.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method performed by an image decoding apparatus according to an aspect of the present disclosure may include acquiring a first flag specifying whether information on a subpicture is present in a bitstream, acquiring a second flag specifying whether picture header information is present in a slice header, and decoding the bitstream based on the first flag and the second flag. When the first flag specifies that the information on the subpicture is present in the bitstream, the second flag may have a value specifying that the picture header information is not present in the slice header.

In the image decoding method according to the present disclosure, when the first flag specifies that the information on the subpicture is present in the bitstream, the slice header may include an identifier of a subpicture including a slice related to the slice header.

The image decoding method according to the present disclosure may further include acquiring the picture header information from the slice header when the second flag specifies that the picture header information is present in the slice header.

In the image decoding method according to the present disclosure, the second flag may have the same value with respect to all slices in a coded layer video sequence (CLVS).

In the image decoding method according to the present disclosure, when the second flag specifies that the picture header information is present in the slice header, a network abstraction layer (NAL) unit for transmitting the picture header information may not be present in a coded layer video sequence (CLVS).

In the image decoding method according to the present disclosure, when the second flag specifies that the picture header information is not present in the slice header, the picture header information may be acquired from a network abstraction layer (NAL) unit with an NAL unit type equal to PH_NUT.

In the image decoding method according to the present disclosure, the first flag may be signaled at a higher level of a slice, and the second flag may be included and signaled in the slice header.

An image decoding apparatus according to another aspect of the present disclosure may include a memory and at least one processor. The at least one processor may be configured to acquire a first flag specifying whether information on a subpicture is present in a bitstream, to acquire a second flag specifying whether picture header information is present in a slice header, and to decode the bitstream based on the first flag and the second flag. When the first flag specifies that the information on the subpicture is present in the bitstream, the second flag may have a value specifying that the picture header information is not present in the slice header.

An image encoding method according to another aspect of the present disclosure may include encoding a first flag specifying whether information on a subpicture is present in a bitstream, encoding a second flag specifying whether picture header information is present in a slice header, and encoding the bitstream based on the first flag and the second flag. When the first flag specifies that the information on the subpicture is present in the bitstream, the second flag may have a value specifying that the picture header information is not present in the slice header.

In the image encoding method according to the present disclosure, when the first flag specifies that the information on the subpicture is present in the bitstream, the slice header may include an identifier of a subpicture including a slice related to the slice header.

The image encoding method according to the present disclosure may further include encoding the picture header information in the slice header when the second flag specifies that the picture header information is present in the slice header.

In the image encoding method according to the present disclosure, the second flag may have the same value with respect to all slices in a coded layer video sequence (CLVS).

In the image encoding method according to the present disclosure, when the second flag specifies that the picture header information is not present in the slice header, the picture header information may be signaled through a network abstraction layer (NAL) unit with an NAL unit type equal to PH_NUT.

In the image encoding method according to the present disclosure, the first flag may be signaled at a higher level of a slice, and the second flag may be included and signaled in the slice header.

In addition, a transmission method according to another aspect of the present disclosure may transmit the bitstream generated by the image encoding apparatus or the image encoding method of the present disclosure.

In addition, a computer-readable recording medium according to another aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

Also, according to the present disclosure, it is possible to provide an image encoding/decoding method and apparatus for improving encoding/decoding efficiency by efficiently signaling information on a subpicture and picture header.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

BRIEF DESCRIPTION OF THE DRAWINGS

FIG. 4 is a view showing a partitioning structure of an image according to an embodiment;

FIG. 5 is a view showing an embodiment of a partitioning type of a block according to a multi-type tree structure;

FIG. 11 is a view showing a syntax structure of a slice header according to an embodiment of the present disclosure;

FIG. 14 is a view showing the syntax structure of a slice header according to another embodiment of the present disclosure;

FIG. 17 is a view showing the syntax structure of a slice header according to another embodiment of the present disclosure;

MODE FOR INVENTION

Figure 1:
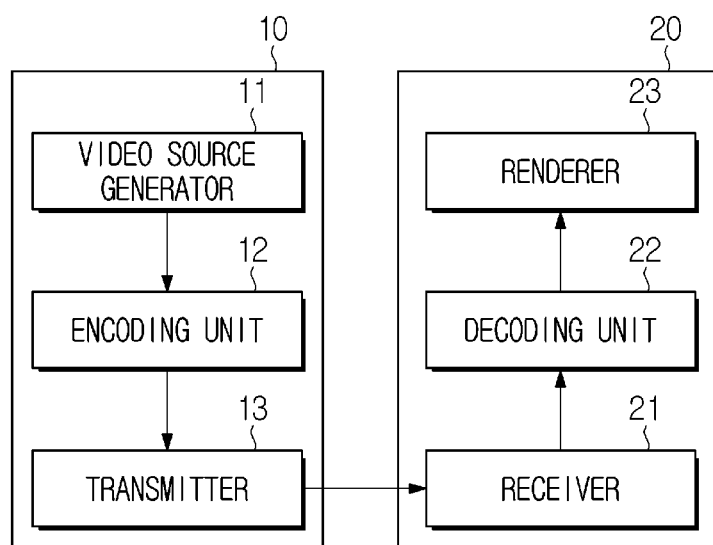
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to the present disclosure.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
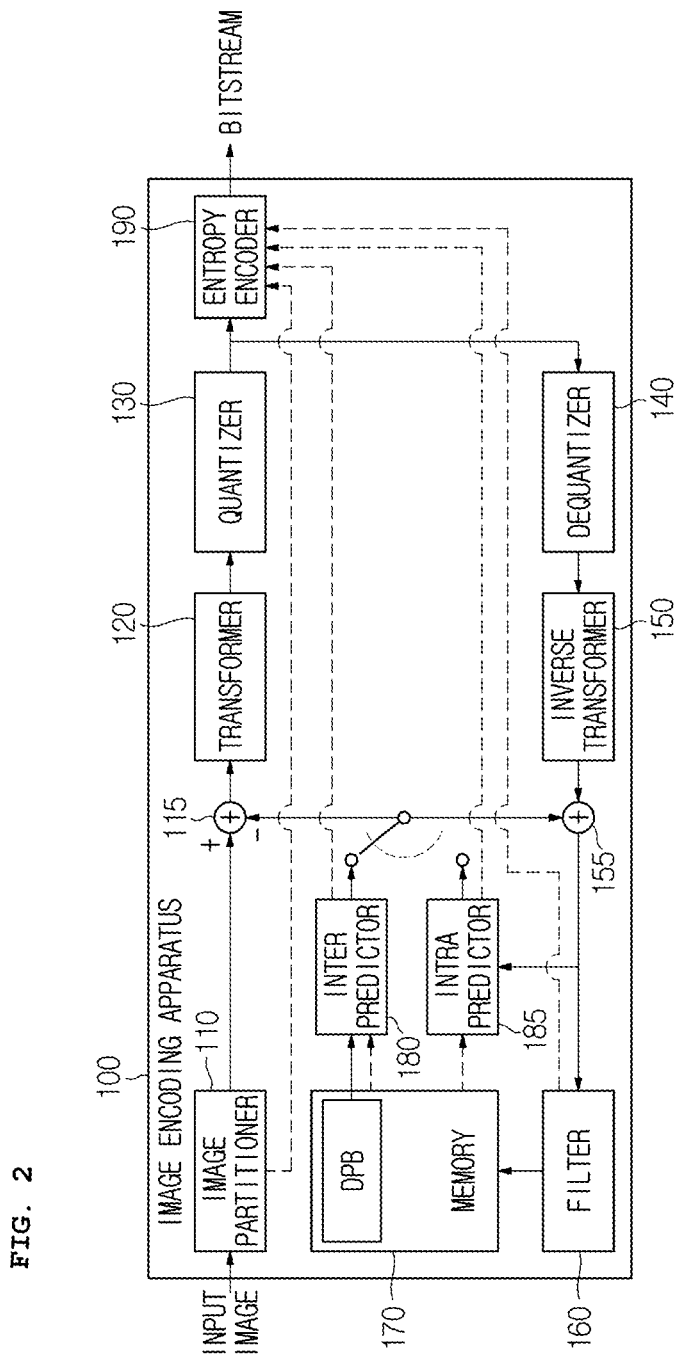
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be collectively referred to as a "predictor". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The predictor (the inter predictor 180 or the intra predictor 185) may perform prediction on a block to be processed (current block) and generate a predicted block including prediction samples for the current block. The predictor may determine whether intra prediction or inter prediction is applied on a current block or CU basis. The predictor may generate various information related to prediction of the current block and transmit the generated information to the entropy encoder 190. The information on the prediction may be encoded in the entropy encoder 190 and output in the form of a bitstream.

The intra predictor 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 185 may determine the prediction mode applied to the current block by using a prediction mode applied to a neighboring block.

The inter predictor 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter predictor 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The predictor may generate a prediction signal based on various prediction methods and prediction techniques described below. For example, the predictor may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the predictor may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the predictor may be used to generate a reconstructed signal or to generate a residual signal. The subtractor 115 may generate a residual signal (residual block or residual sample array) by subtracting the prediction signal (predicted block or prediction sample array) output from the predictor from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter predictor 180 or the intra predictor 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter predictor 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter predictor 180. The memory 170 may store the motion information of the block from which the motion information in the current picture is derived (or encoded) and/or the motion information of the blocks in the picture that have already been reconstructed. The stored motion information may be transmitted to the inter predictor 180 and used as the motion information of the spatial neighboring block or the motion information of the temporal neighboring block. The memory 170 may store reconstructed samples of reconstructed blocks in the current picture and may transfer the reconstructed samples to the intra predictor 185.

Overview of Image Decoding Apparatus

Figure 3:
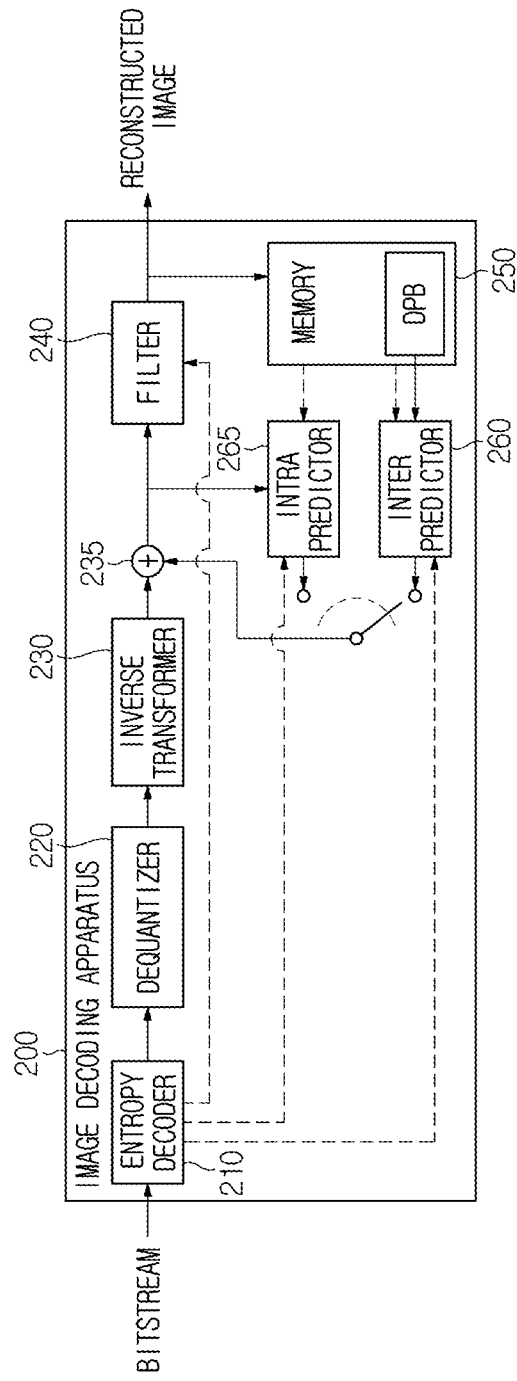
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively referred to as a "predictor". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the predictor (the inter predictor 260 and the intra predictor 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter predictor 160 or the intra predictor 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 210 and may determine a specific intra/inter prediction mode (prediction technique).

It is the same as described in the predictor of the image encoding apparatus 100 that the predictor may generate the prediction signal based on various prediction methods (techniques) which will be described later.

The intra predictor 265 may predict the current block by referring to the samples in the current picture. The description of the intra predictor 185 is equally applied to the intra predictor 265.

The inter predictor 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the predictor (including the inter predictor 260 and/or the intra predictor 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter predictor 260. The memory 250 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 250 may store reconstructed samples of reconstructed blocks in the current picture and transfer the reconstructed samples to the intra predictor 265.

In the present disclosure, the embodiments described in the filter 160, the inter predictor 180, and the intra predictor 185 of the image encoding apparatus 100 may be equally or correspondingly applied to the filter 240, the inter predictor 260, and the intra predictor 265 of the image decoding apparatus 200.

Overview of Image Partitioning

The video/image coding method according to the present disclosure may be performed based on an image partitioning structure as follows. Specifically, the procedures of prediction, residual processing ((inverse) transform, (de)quantization, etc.), syntax element coding, and filtering, which will be described later, may be performed based on a CTU, CU (and/or TU, PU) derived based on the image partitioning structure. The image may be partitioned in block units and the block partitioning procedure may be performed in the image partitioner 110 of the encoding apparatus. The partitioning related information may be encoded by the entropy encoder 190 and transmitted to the decoding apparatus in the form of a bitstream. The entropy decoder 210 of the decoding apparatus may derive a block partitioning structure of the current picture based on the partitioning related information obtained from the bitstream, and based on this, may perform a series of procedures (e.g., prediction, residual processing, block/picture reconstruction, in-loop filtering, etc.) for image decoding.

Pictures may be partitioned into a sequence of coding tree units (CTUs). FIG. 4 shows an example in which a picture is partitioned into CTUs. The CTU may correspond to a coding tree block (CTB). Alternatively, the CTU may include a coding tree block of luma samples and two coding tree blocks of corresponding chroma samples. For example, for a picture that contains three sample arrays, the CTU may include an N×N block of luma samples and two corresponding blocks of chroma samples.

Overview of Partitioning of CTU

As described above, the coding unit may be acquired by recursively partitioning the coding tree unit (CTU) or the largest coding unit (LCU) according to a quad-tree/binary-tree/ternary-tree (QT/BT/TT) structure. For example, the CTU may be first partitioned into quadtree structures. Thereafter, leaf nodes of the quadtree structure may be further partitioned by a multi-type tree structure.

Partitioning according to quadtree means that a current CU (or CTU) is partitioned into equally four. By partitioning according to quadtree, the current CU may be partitioned into four CUs having the same width and the same height. When the current CU is no longer partitioned into the quadtree structure, the current CU corresponds to the leaf node of the quad-tree structure. The CU corresponding to the leaf node of the quadtree structure may be no longer partitioned and may be used as the above-described final coding unit. Alternatively, the CU corresponding to the leaf node of the quadtree structure may be further partitioned by a multi-type tree structure.

FIG. 5 is a view showing an embodiment of a partitioning type of a block according to a multi-type tree structure. Partitioning according to the multi-type tree structure may include two types of splitting according to a binary tree structure and two types of splitting according to a ternary tree structure.

The two types of splitting according to the binary tree structure may include vertical binary splitting (SPLIT_BT_VER) and horizontal binary splitting (SPLIT_BT_HOR). Vertical binary splitting (SPLIT_BT_VER) means that the current CU is split into equally two in the vertical direction. As shown in FIG. 4, by vertical binary splitting, two CUs having the same height as the current CU and having a width which is half the width of the current CU may be generated. Horizontal binary splitting (SPLIT_BT_HOR) means that the current CU is split into equally two in the horizontal direction. As shown in FIG. 5, by horizontal binary splitting, two CUs having a height which is half the height of the current CU and having the same width as the current CU may be generated.

Two types of splitting according to the ternary tree structure may include vertical ternary splitting (SPLIT_TT_VER) and horizontal ternary splitting (SPLIT_TT_HOR). In vertical ternary splitting (SPLIT_TT_VER), the current CU is split in the vertical direction at a ratio of 1:2:1. As shown in FIG. 5, by vertical ternary splitting, two CUs having the same height as the current CU and having a width which is ¼ of the width of the current CU and a CU having the same height as the current CU and having a width which is half the width of the current CU may be generated. In horizontal ternary splitting (SPLIT_TT_HOR), the current CU is split in the horizontal direction at a ratio of 1:2:1. As shown in FIG. 5, by horizontal ternary splitting, two CUs having a height which is ¼ of the height of the current CU and having the same width as the current CU and a CU having a height which is half the height of the current CU and having the same width as the current CU may be generated.

Figure 6:
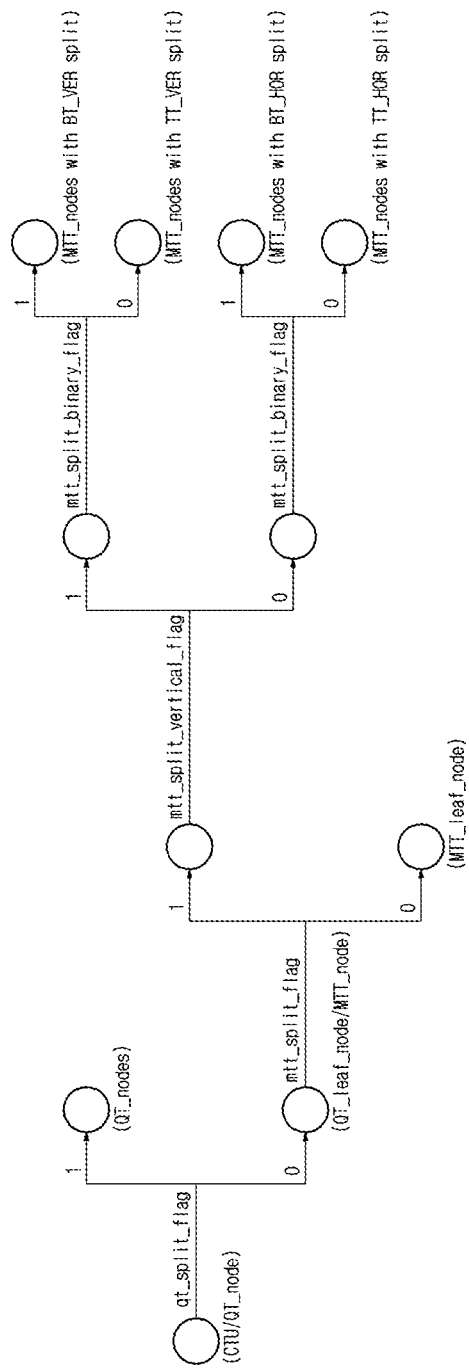
FIG. 6 is a view showing a signaling mechanism of block splitting information in a quadtree with nested multi-type tree structure according to the present disclosure.

FIG. 6 is a view showing a signaling mechanism of block splitting information in a quadtree with nested multi-type tree structure according to the present disclosure.

Here, the CTU is treated as the root node of the quadtree, and is partitioned for the first time into a quadtree structure. Information (e.g., qt_split_flag) indicating whether quadtree splitting is performed with respect to the current CU (CTU or node (QT_node) of the quadtree) is signaled. For example, when qt_split_flag has a first value (e.g., "1"), the current CU may be quadtree-partitioned. In addition, when qt_split_flag has a second value (e.g., "0"), the current CU is not quadtree-partitioned, but becomes the leaf node (QT_leaf_node) of the quadtree. Each quadtree leaf node may then be further partitioned into multitype tree structures. That is, the leaf node of the quadtree may become the node (MTT_node) of the multi-type tree. In the multitype tree structure, a first flag (e.g., Mtt_split_cu_flag) is signaled to indicate whether the current node is additionally partitioned. If the corresponding node is additionally partitioned (e.g., if the first flag is 1), a second flag (e.g., Mtt_split_cu_vertical_flag) may be signaled to indicate the splitting direction. For example, the splitting direction may be a vertical direction if the second flag is 1 and may be a horizontal direction if the second flag is 0. Then, a third flag (e.g., Mtt_split_cu_binary_flag) may be signaled to indicate whether the split type is a binary split type or a ternary split type. For example, the split type may be a binary split type when the third flag is 1 and may be a ternary split type when the third flag is 0. The node of the multi-type tree acquired by binary splitting or ternary splitting may be further partitioned into multi-type tree structures. However, the node of the multi-type tree may not be partitioned into quadtree structures. If the first flag is 0, the corresponding node of the multi-type tree is no longer split but becomes the leaf node (MTT_leaf_node) of the multi-type tree. The CU corresponding to the leaf node of the multi-type tree may be used as the above-described final coding unit.

Based on the mtt_split_cu_vertical_flag and the mtt_split_cu_binary_flag, a multi-type tree splitting mode (MttSplitMode) of a CU may be derived as shown in Table 1 below. In the following description, the multi-type tree splitting mode may be referred to as a multi-tree splitting type or splitting type.

TABLE 1

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 7:
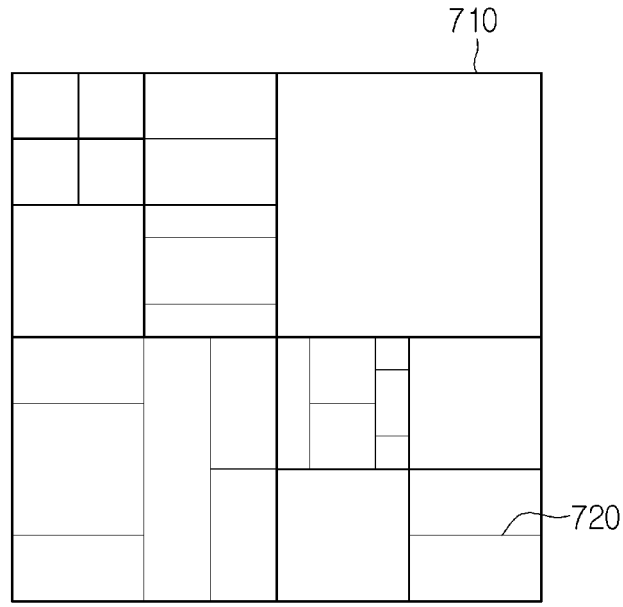
FIG. 7 is a view showing an embodiment in which a CTU is partitioned into multiple CUs.

FIG. 7 is a view showing an example in which a CTU is partitioned into multiple CUs by applying a multi-type tree after applying a quadtree. In FIG. 7, bold block edges 710 represent quadtree partitioning and the remaining edges 720 represent multitype tree partitioning. The CU may correspond to a coding block (CB). In an embodiment, the CU may include a coding block of luma samples and two coding blocks of chroma samples corresponding to the luma samples.

A chroma component (sample) CB or TB size may be derived based on a luma component (sample) CB or TB size according to the component ratio according to the color format (chroma format, e.g., 4:4:4, 4:2:2, 4:2:0 or the like) of the picture/image. In case of 4:4:4 color format, the chroma component CB/TB size may be set equal to be luma component CB/TB size. In case of 4:2:2 color format, the width of the chroma component CB/TB may be set to half the width of the luma component CB/TB and the height of the chroma component CB/TB may be set to the height of the luma component CB/TB. In case of 4:2:0 color format, the width of the chroma component CB/TB may be set to half the width of the luma component CB/TB and the height of the chroma component CB/TB may be set to half the height of the luma component CB/TB.

In an embodiment, when the size of the CTU is 128 based on the luma sample unit, the size of the CU may have a size from 128×128 to 4×4 which is the same size as the CTU. In one embodiment, in case of 4:2:0 color format (or chroma format), a chroma CB size may have a size from 64×64 to 2×2.

Meanwhile, in an embodiment, the CU size and the TU size may be the same. Alternatively, there may be a plurality of TUs in a CU region. The TU size generally represents a luma component (sample) transform block (TB) size.

The TU size may be derived based a largest allowable TB size maxTbSize which is a predetermined value. For example, when the CU size is greater than maxTbSize, a plurality of TUs (TBs) having maxTbSize may be derived from the CU and transform/inverse transform may be performed in units of TU (TB). For example, the largest allowable luma TB size may be 64×64 and the largest allowable chroma TB size may be 32×32. If the width or height of the CB partitioned according to the tree structure is larger than the largest transform width or height, the CB may be automatically (or implicitly) partitioned until the TB size limit in the horizontal and vertical directions is satisfied.

In addition, for example, when intra prediction is applied, an intra prediction mode/type may be derived in units of CU (or CB) and a neighboring reference sample derivation and prediction sample generation procedure may be performed in units of TU (or TB). In this case, there may be one or a plurality of TUs (or TBs) in one CU (or CB) region and, in this case, the plurality of TUs or (TBs) may share the same intra prediction mode/type.

Meanwhile, for a quadtree coding tree scheme with nested multitype tree, the following parameters may be signaled as SPS syntax elements from the encoding apparatus to the decoding apparatus. For example, at least one of a CTU size which is a parameter representing the root node size of a quadtree, MinQTSize which is a parameter representing the minimum allowed quadtree leaf node size, MaxBtSize which is a parameter representing the maximum allowed binary tree root node size, MaxTtSize which is a parameter representing the maximum allowed ternary tree root node size, MaxMttDepth which is a parameter representing the maximum allowed hierarchy depth of multi-type tree splitting from a quadtree leaf node, MinBtSize which is a parameter representing the minimum allowed binary tree leaf node size, or MinTtSize which is a parameter representing the minimum allowed ternary tree leaf node size is signaled.

As an embodiment of using 4:2:0 chroma format, the CTU size may be set to 128×128 luma blocks and two 64×64 chroma blocks corresponding to the luma blocks. In this case, MinOTSize may be set to 16×16, MaxBtSize may be set to 128×128, MaxTtSzie may be set to 64×64, MinBtSize and MinTtSize may be set to 4×4, and MaxMttDepth may be set to 4. Quadtree partitioning may be applied to the CTU to generate quadtree leaf nodes. The quadtree leaf node may be called a leaf QT node. Quadtree leaf nodes may have a size from a 16×16 size (e.g., the MinOTSize) to a 128×128 size (e.g., the CTU size). If the leaf QT node is 128×128, it may not be additionally partitioned into a binary tree/ternary tree. This is because, in this case, even if partitioned, it exceeds MaxBtsize and MaxTtszie (e.g., 64×64). In other cases, leaf QT nodes may be further partitioned into a multitype tree. Therefore, the leaf QT node is the root node for the multitype tree, and the leaf QT node may have a multitype tree depth (mttDepth) 0 value. If the multitype tree depth reaches MaxMttdepth (e.g., 4), further partitioning may not be considered further. If the width of the multitype tree node is equal to MinBtSize and less than or equal to 2×MinTtSize, then no further horizontal partitioning may be considered. If the height of the multitype tree node is equal to MinBtSize and less than or equal to 2×MinTtSize, no further vertical partitioning may be considered. When partitioning is not considered, the encoding apparatus may skip signaling of partitioning information. In this case, the decoding apparatus may derive partitioning information with a predetermined value.

Meanwhile, one CTU may include a coding block of luma samples (hereinafter referred to as a "luma block") and two coding blocks of chroma samples corresponding thereto (hereinafter referred to as "chroma blocks"). The above-described coding tree scheme may be equally or separately applied to the luma block and chroma block of the current CU. Specifically, the luma and chroma blocks in one CTU may be partitioned into the same block tree structure and, in this case, the tree structure is represented as SINGLE_TREE. Alternatively, the luma and chroma blocks in one CTU may be partitioned into separate block tree structures, and, in this case, the tree structure may be represented as DUAL_TREE. That is, when the CTU is partitioned into dual trees, the block tree structure for the luma block and the block tree structure for the chroma block may be separately present. In this case, the block tree structure for the luma block may be called DUAL_TREE_LUMA, and the block tree structure for the chroma component may be called DUAL_TREE_CHROMA. For P and B slice/tile groups, luma and chroma blocks in one CTU may be limited to have the same coding tree structure. However, for I slice/tile groups, luma and chroma blocks may have a separate block tree structure from each other. If the separate block tree structure is applied, the luma CTB may be partitioned into CUs based on a particular coding tree structure, and the chroma CTB may be partitioned into chroma CUs based on another coding tree structure. That is, this means that a CU in an I slice/tile group, to which the separate block tree structure is applied, may include a coding block of luma components or coding blocks of two chroma components and a CU of a P or B slice/tile group may include blocks of three color components (a luma component and two chroma components).

Although a quadtree coding tree structure with a nested multitype tree has been described, a structure in which a CU is partitioned is not limited thereto. For example, the BT structure and the TT structure may be interpreted as a concept included in a multiple partitioning tree (MPT) structure, and the CU may be interpreted as being partitioned through the QT structure and the MPT structure. In an example where the CU is partitioned through a QT structure and an MPT structure, a syntax element (e.g., MPT_split_type) including information on how many blocks the leaf node of the QT structure is partitioned into and a syntax element (ex. MPT_split_mode) including information on which of vertical and horizontal directions the leaf node of the QT structure is partitioned into may be signaled to determine a partitioning structure.

In another example, the CU may be partitioned in a different way than the QT structure, BT structure or TT structure. That is, unlike that the CU of the lower depth is partitioned into ¼ of the CU of the higher depth according to the QT structure, the CU of the lower depth is partitioned into ½ of the CU of the higher depth according to the BT structure, or the CU of the lower depth is partitioned into ¼ or ½ of the CU of the higher depth according to the TT structure, the CU of the lower depth may be partitioned into ⅕, ⅓, ⅜, ⅗, ⅔, or ⅝ of the CU of the higher depth in some cases, and the method of partitioning the CU is not limited thereto.

The quadtree coding block structure with the multi-type tree may provide a very flexible block partitioning structure. Because of the partition types supported in a multi-type tree, different partition patterns may potentially result in the same coding block structure in some cases. In the encoding apparatus and the decoding apparatus, by limiting the occurrence of such redundant partition patterns, a data amount of partitioning information may be reduced.

Encoding/Decoding of Image Based on Subpicture

One encoding target picture may be partitioned in units of a plurality of CTUs, slices, tiles or bricks and a picture may be partitioned in units of a plurality of subpictures.

Within the picture, a subpicture may be encoded or decoded regardless of a preceding subpicture is encoded or decoded. For example, different quantization or different resolution may be applied for the plurality of subpictures.

Further, each subpicture may be processed like a separate picture. For example, an encoding target picture may be a projected picture or a packed picture in an omnidirectional image/video or 360-degree image/video.

In such an embodiment, a part of a picture may be rendered or displayed based on the viewport of a user terminal (e.g., a head mounted display). Accordingly, in order to implement low delay, among subpictures configuring one picture, at least one subpicture covering the viewport may be encoded or decoded preferentially or independently of the remaining subpictures.

The encoding result of the subpicture may be referred to as a sub-bitstream, a substream or simply a bitstream. The decoding apparatus may decode the subpicture from the sub-bitstream, the substream or the bitstream. In this case, a high level syntax (HLS) such as a PPS, an SPS, a VPS and/or a decoding parameter set (DPS) may be used to encode/decode the subpicture.

In the present disclosure, the high level syntax (HLS) may include at least one of the APS syntax, the PPS syntax, the SPS syntax, the VPS syntax, the DPS syntax or the SH syntax. For example, the APS (APS syntax) or the PPS (PPS syntax) may include information/parameters that may be commonly applied to one or more slices or pictures. The SPS (SPS syntax) may include information/parameters that may be commonly applied to one or more sequences. The VPS (VPS syntax) may include information/parameters that may be commonly applied to multiple layers. The DPS (DPS syntax) may include information/parameters that may be commonly applied to the overall video. For example, the DPS may include information/parameters related to concatenation of a coded video sequence (CVS).

The subpicture may configure a rectangular region of the coded picture. The size of the subpicture may be differently set within the picture. For all pictures belonging to one sequence, the size and location of a particular separate subpicture may be equally set. The separate subpicture sequence may be independently decoded. A tile and a slice (and CTBs) may be restricted not to span across a subpicture boundary. To this end, the encoding apparatus may perform encoding such that the subpictures are independently decoded. To this end, semantic restrictions in the bitstream may be required. In addition, for each picture in one sequence, arrangement of tiles, slices and bricks in the subpicture may be differently configured.

Subpicture design aims at abstraction or encapsulation of a range which is smaller than a picture level but is larger than a slice or tile group level. Accordingly, a VCL NAL unit of a motion constraint tile set (MCTS) subset may be extracted from one VVC bitstream and processing such as rearrangement to another WC bitstream may be performed without difficulty such as modification at the VCL-level. Here, the MCTS is encoding technology that enables spatial and temporal independence between tiles. When the MCTS is applied, information on tiles which are not included in the MCTS to which the current tile belongs cannot be referred to. When the image is partitioned into MCTSs and is encoded, independent transmission and encoding of the MCTS are possible.

Such subpicture design has an advantage in changing the viewing orientation in mixed resolution viewport dependent 360° streaming schemes.

Hereinafter, an image encoding/decoding method using a slice/tile will be described with reference to FIGS. 8 and 9.

Figure 8:
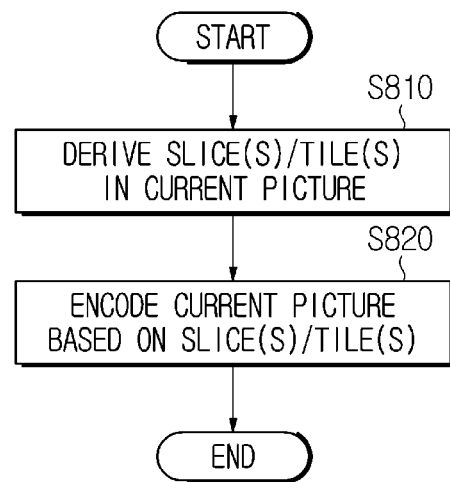
FIG. 8 is a flowchart illustrating a method of encoding an image using a slice/tile by an image encoding apparatus according to an embodiment of the present disclosure.

FIG. 8 is a flowchart illustrating a method of encoding an image using a slice/tile by an image encoding apparatus according to an embodiment of the present disclosure.

The image encoding apparatus may derive slice(s)/tile(s) in a current picture by partitioning the current picture (S810).

The image encoding apparatus may encode the current picture based on the slice(s)/tile(s) derived in step S810 (S820).

Figures 9, 10:
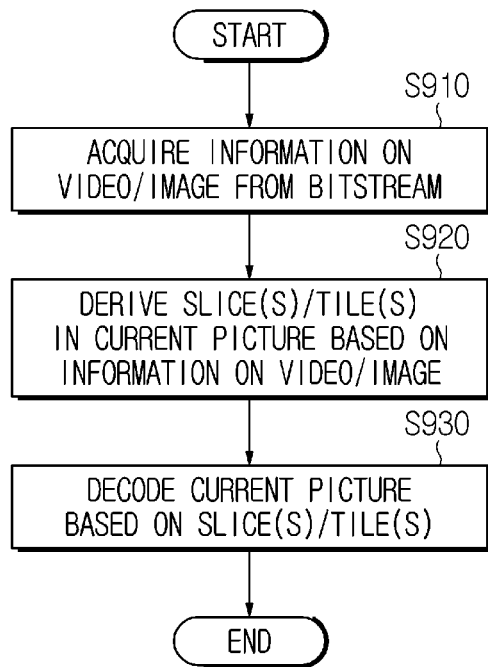
FIG. 9 is a flowchart illustrating a method of decoding an image using a slice/tile by an image decoding apparatus according to an embodiment of the present disclosure.
FIG. 10 is a view showing an example of the present disclosure of a signaling and syntax element in a picture header.

FIG. 9 is a flowchart illustrating a method of decoding an image using a slice/tile by an image decoding apparatus according to an embodiment of the present disclosure.

The image decoding apparatus may acquire information on a video/image from a bitstream (S910).

In addition, the image decoding apparatus may derive slice(s)/tile(s) in a current picture based on the information on the video/image acquired in step S910 (S920). Here, the information on the video/image may include information on the slice(s)/tile(s).

Next, the image decoding apparatus may decode the current picture based on the slice(s)/tile(s) derived in step S920 (S930).

In FIGS. 8 and 9, the information on the slice(s)/tile(s) may include various information and/or syntax elements described in the present disclosure. The video/image information may include a high level syntax, and the high level syntax may include the information on the slice(s) and/or the information on the tile(s). The high level syntax may include a picture header, and information on the picture header may be included in the slice header described in the present disclosure. The information on the slice(s) may include information specifying one or more slices, and the information on the tile(s) may include information specifying one or more tiles. A slice including one or more tiles may be present in the picture.

High Level Syntax (HLS) Signaling

As described above, the high level syntax may be coded/signaled for video/image coding. Hereinafter, signaling and syntax elements in a picture header and a slice header according to the present disclosure will be described.

Picture Header and Slice Header

A coded picture may consist of one or a plurality of slices. Parameters for a coded picture are signalled within a picture header (PH) and parameters for a slice are signalled within a slice header (SH). The PH is carried in its own NAL unit type. The SH may be present in the beginning of a NAL unit containing payload of a slice (i.e., slice data). Hereinafter, syntax element(s) of the PH and SH and the semantics of the syntax elements will be described referring to FIG. 10 and FIG. 11.

FIG. 10 is a view showing an example of the present disclosure of a signaling and syntax element in a picture header.

picture_header_rbsp( ) contains information that is common for all slices of the coded picture associated with the picture header (PH). For example, picture_header_rbsp( ) may include a reference picture flag (non_reference_picture_flag), GDR picture identification information (gdr_pic_flag), no_output_of_prior_pics_flag, recovery_poc_cnt, ph_pic_parameter_set_id or the like. Here, recovery_poc_cnt is signaled in picture_header_rbsp( ) when gdr_pic_flag is 1.

A first value (e.g., 1) of non_reference_picture_flag specifies that the picture associated with the PH is not used as a reference picture. A second value (e.g., 0) of non_reference_picture_flag specifies that the picture associated with the PH may or may not be used as a reference picture.

A first value (e.g., 1) of gdr_pic_flag specifies that the picture associated with the PH is a GDR picture. A second value (e.g., 0) of gdr_pic_flag specifies that the picture associated with the PH is not a GDR picture.

no_output_of_prior_pics_flag affects the output of previously-decoded pictures in the DPB after the decoding of a coded layer video sequence (CLVSS) picture that is not the first picture in the bitstream.

recovery_poc_cnt specifies the recovery point of decoded pictures in output order.

ph_pic_parameter_set_id specifies the value of pps_pic_parameter_set_id for the picture parameter set (PPS) in use. pps_pic_parameter_set_id is a value for identifying the PPS to be referred to in another syntax.

The syntax elements included in the picture_header_rbsp ( ) syntax structure of FIG. 10 may be included and signaled in the picture_header_structure( ) syntax structure. In this case, the picture_header_structure( ) syntax structure may be included and signaled in the picture_header_rbsp( ) syntax structure.

FIG. 11 is a view showing a syntax structure of a slice header according to an embodiment of the present disclosure.

As shown in FIG. 11, picture_header_in_slice_header_flag, picture_header_structure( ), slice_subpic_id, slice_address, num_tiles_in_slice_minus1 or the like may be signaled through a slice header.

In the example shown in FIG. 11, picture_header_in_slice_header_flag specifies whether a picture header syntax structure is present in a slice header syntax structure. A first value (e.g., 1 or True) of picture_header_in_slice_header_flag specifies that the picture header is present in the slice header and a second value (e.g., 0 or False) of picture_header_in_slice_header_flag specifies that the picture header is not present in the slice header.

picture_header_structure( ) may be acquired based on picture_header_in_slice_header_flag. For example, picture_header_structure( ) may be signaled when picture_header_in_slice_header_flag has a first value. When picture_header_in_slice_header_flag has a second value, picture_header_structure( ) may not be included in the slice header, but may be included and signaled in a separate NAL unit.

slice_subpic_id may be information on a subpicture identifier for identifying a subpicture including a current slice. slice_subpic_id may be acquired based on subpics_present_flag. For example, slice_subpic_id may be signaled when subpics_present_flag is 1. subpics_present_flag may specify whether a subpicture is present in the current picture or whether information on a subpicture is present in the bitstream. For example, a first value (e.g., 1 or True) of subpics_present_flag may specify that information on a subpicture is present in the bitstream or one or more subpictures are present in the current picture. A second value (e.g., 0 or False) of subpics_present_flag may specify that information on a subpicture is not present in the bitstream or a subpicture is not present in the current picture.

slice_address may specify the address in the current picture of the current slice. slice_address may be acquired based on rect_slice_flag and/or NumTilesInPic. For example, when rect_slice_flag is a first value (e.g., 1 or True) or NumTilesInPic is greater than 1, slice_address may be signaled in the slice header. At this time, rect_slice_flag may be an indicator indicating whether the slice included in the current picture is a rectangular slice. For example, rect_slice_flag may be signaled at a picture level (PPS or picture header). In addition, NumTilesInPic may specify the number of tiles included in the current picture.

num_tiles_in_slice_minus1 may specify the number of tiles included in the current slice. num_tiles_in_slice_minus1 may be acquired based on rect_slice_flag and NumTilesInPic. For example, when rect_slice_flag is a second value (e.g., 0 or False) and NumTilesInPic is greater than 1, num_tiles_in_slice_minus1 may be signaled in the slice header.

In the embodiment shown in FIG. 11, as a requirement of bitstream conformance associated with picture_header_in_slice_header_flag, the following may be included.

In order to satisfy bitstream conformance, it is required that the value of picture_header_in_slice_header_flag is the same in all slices of a CLVS.

In addition, when picture_header_in_slice_header_flag is a first value (e.g., 1), in order to satisfy bitstream conformance, it is required that a NAL unit with NAL unit type equal to PH_NUT is not present in the CLVS.

In addition, when picture_header_in_slice_header_flag is a second value (e.g., 0), in order to satisfy bitstream conformance, it is required that a NAL unit with NAL unit type equal to PH_NUT is present in the PU, preceding the first VCL NAL unit of the PU.

Figure 12:
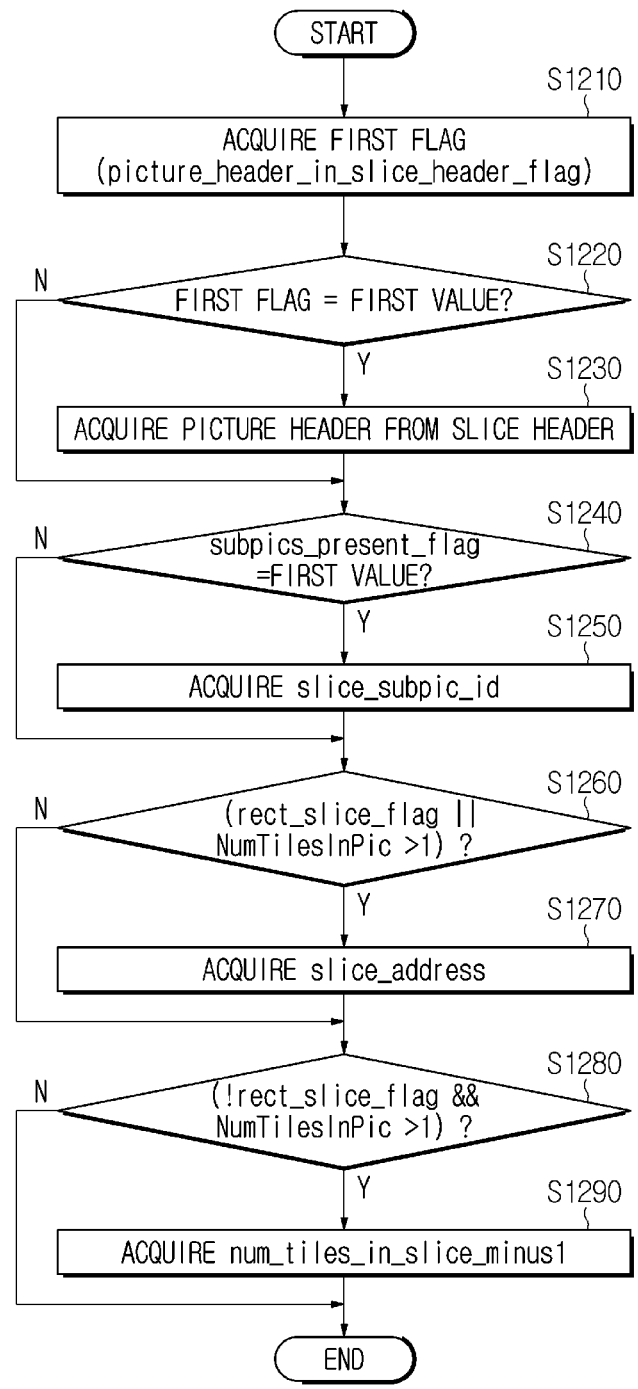
FIG. 12 is a flowchart illustrating a method of parsing and decoding the slice header of FIG. 11.

FIG. 12 is a flowchart illustrating a method of parsing and decoding the slice header of FIG. 11.

First, the image decoding apparatus may acquire a first flag (picture_header_in_slice_header_flag) included in the slice header (S1210).

The first flag may specify whether a picture header is present in the slice header. In addition, the first flag may specify whether the current picture includes only one slice.

When the first flag is a first value (e.g., 1 or True) (step S1220-Yes), the image decoding apparatus may acquire a picture header from the slice header (S1230). When the first flag is a second value (e.g., 0 or False) (step S1220-No), the picture header may be acquired from the picture header NAL unit rather than the slice header (not shown).

Thereafter, it may be determined whether subpics_present_flag is a first value (e.g., 1 or True) in step S1240. subpics_present_flag may specify whether the current picture includes a subpicture. In addition, subpics_present_flag may specify whether information on a subpicture is included in the bitstream. subpics_present_flag may be signaled at a higher level of a slice. For example, subpics_present_flag may be included and signaled in a sequence parameter set.

When subpics_present_flag is a first value (e.g., 1 or True) (step S1240-Yes), the image decoding apparatus may acquire slice_subpic_id from the slice header (S1250). When subpics_present_flag is a second value (e.g., 0 or False) (step S1240-No), the image decoding apparatus may omit (skip) parsing of slice_subpic_id from the slice header.

Thereafter, in step S1260, it may be determined whether rect_slice_flag is a first value (e.g., 1 or True) and/or NumTilesInPic is greater than 1. rect_slice_flag may be an indicator indicating whether the slice included in the current picture is a rectangular slice. For example, rect_slice_flag may be signaled at a picture level (PPS or picture header). In addition, NumTilesInPic may specify the number of tiles included in the current picture.

When rect_slice_flag is a first value (e.g. 1 or True) or NumTilesInPic is greater than 1 (step S1260-Yes), the image decoding apparatus may acquire slice_address from the slice header (S1270). When rect_slice_flag is a second value (e.g., 0 or False) and NumTilesInPic is not greater than 1 (step S1260-No), the image decoding apparatus may omit (skip) parsing of slice_address from the slice header.

Thereafter, in step S1280, it may be determined whether rect_slice_flag is a first value (e.g., 1 or True) and/or whether NumTilesInPic is greater than 1.

When rect_slice_flag is a first value (e.g., 1 or True) or NumTilesInPic is not greater than 1 (step S1280-No), the image decoding apparatus may omit (skip) parsing of num_tiles_in_slice_minus1 from the slice header. When rect_slice_flag is a second value (e.g., 0 or False) and NumTilesInPic is greater than 1 (step S1280-Yes), the image decoding apparatus may acquire num_tiles_in_slice_minus1 from the slice header (S1290).

Thereafter, the image decoding apparatus may decode the slice header, by parsing subsequent syntax elements, which are not shown, from the slice header.

Figure 13:
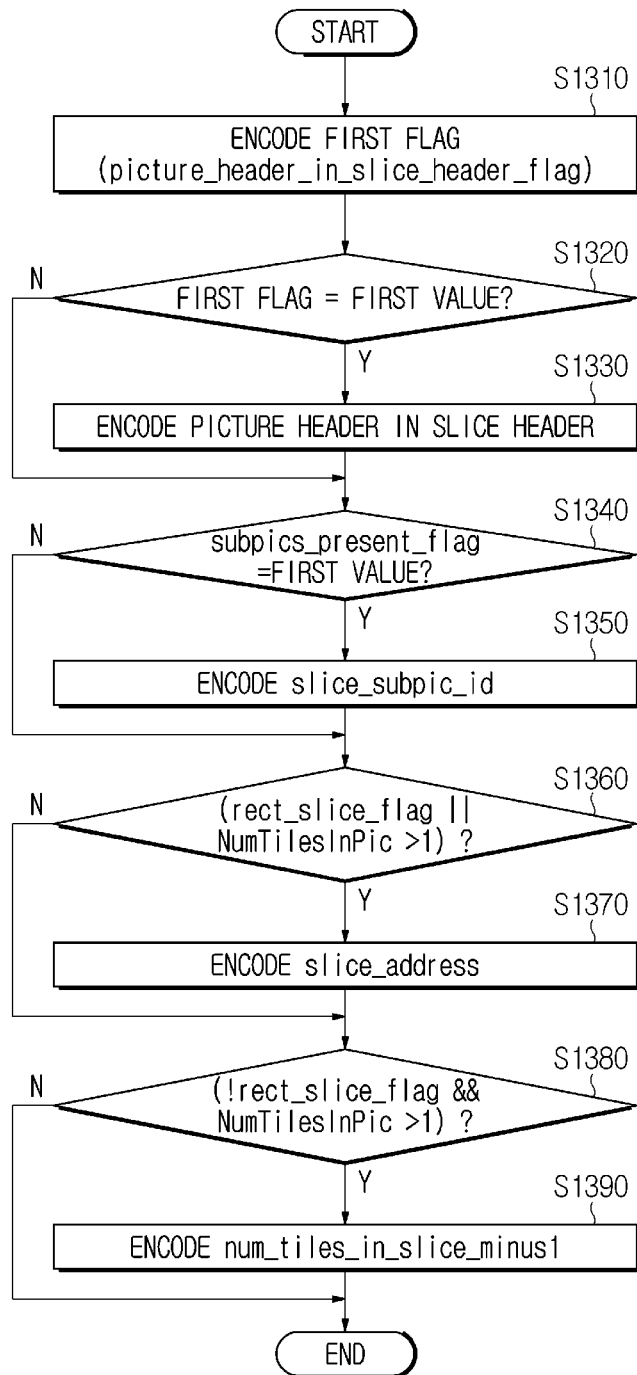
FIG. 13 is a flowchart illustrating a method of encoding the slice header of FIG. 11.

FIG. 13 is a flowchart illustrating a method of encoding the slice header of FIG. 11.

First, the image encoding apparatus may determine the value of a first flag (picture_header_in_slice_header_flag) and encode the first flag in the slice header (S1310).

When the first flag is a first value (e.g., 1 or True) (step S1320-Yes), the image encoding apparatus may encode the picture header in the slice header (S1330). When the first flag is a second value (e.g., 0 or False) (step S1320-No), the picture header is not encoded in the slice header but may be included and signaled in the picture header NAL unit (not shown).

Thereafter, in step S1340, it may be determined whether subpics_present_flag is a first value (e.g., 1 or True). subpics_present_flag may be determined and signaled at a higher level of the slice. For example, subpics_present_flag may be included and signaled in the sequence parameter set.

When subpics_present_flag is a first value (e.g., 1 or True) (step S1340-Yes), the image encoding apparatus may encode slice_subpic_id in the slice header (S1350). When subpics_present_flag is a second value (e.g., 0 or False) (step S1340-No), the image encoding apparatus may omit (skip) encoding of slice_subpic_id in the slice header.

Thereafter, in step S1360, it may be determined whether rect_slice_flag is a first value (e.g., 1 or True) and/or whether NumTilesInPic is greater than 1.

When rect_slice_flag is a first value (e.g., 1 or True) or when NumTilesInPic is greater than 1 (step S1360-Yes), the image encoding apparatus may encode slice_address in the slice header (S1370). When rect_slice_flag is a second value (e.g., 0 or False) and NumTilesInPic is not greater than 1 (step S1360-No), the image encoding apparatus may omit (skip) encoding of slice_address in the slice header.

Thereafter, in step S1380, it may be determined whether rect_slice_flag is a first value (e.g., 1 or True) and/or whether NumTilesInPic is greater than 1.

When rect_slice_flag is a first value (e.g., 1 or True) or when NumTilesInPic is not greater than 1 (step S1380-No), the image encoding apparatus may omit (skip) encoding of num_tiles_in_slice_minus1 in the slice header. When rect_slice_flag is a second value (e.g., 0 or False) and NumTilesInPic is greater than 1 (step S1380-Yes), the image encoding apparatus may encode num_tiles_in_slice_minus1 in the slice header (S1390).

Thereafter, the image encoding apparatus may encode the slice header, by encoding subsequent syntax elements, which are not shown, in the slice header.

In the example described with reference to FIGS. 12 and 13, some steps may be changed or omitted. For example, conditions related to encoding/decoding of slice_address and/or num_tiles_in_slice_minus1 may be changed.

Hereinafter, a method of improving the embodiment described with reference to FIGS. 11 to 13 in consideration of encoding/decoding of an image based on a subpicture will be described.

The image encoding apparatus may encode the current picture based on a subpicture. Alternatively, the image encoding apparatus may encode at least one subpicture configuring the current picture and generate a bitstream including encoded information of the encoded at least one subpicture.

The image decoding apparatus may decode at least one subpicture included in the current picture based on the bitstream including encoded information of at least one subpicture.

As described above, picture_header_in_slice_header_flag may specify whether a picture header is present in the slice header. In addition, picture_header_in_slice_header_flag may be used to specify whether the current picture includes only one slice or more slices. When the current picture includes only one slice, since the slice is the only slice in the current picture, some syntax elements in the slice header have fixed values. In this case, it may be efficient not to signal some syntax elements having the fixed values.

Hereinafter, various configurations of the present disclosure for performing efficient signaling will be described. The following configurations may be applied to the embodiments of the present disclosure individually or in combinations.

Configuration 1

When the current picture includes only one slice, signaling of some syntax elements in the slice header may be skipped (omitted). The value of the syntax element, signaling of which is omitted, may be derived or inferred by the image encoding apparatus and/or the image decoding apparatus.

Whether the current picture includes only one slice may be indicated by a predetermined indicator. Accordingly, when the indicator indicates that the current picture includes only one slice, some syntax elements may not be included in the slice header and the values thereof may be inferred or derived. At this time, the indicator may be used as a condition indicating whether some syntax elements are included in the slice header.

Configuration 2

The indicator described in Configuration 1 may be, for example, picture_header_in_slice_header_flag.

Configuration 3

A syntax element in the slice header, signaling of which may be omitted according to the value of picture_header_in_slice_header_flag, may include at least one of (a) or (b) below.

(a) Syntax Element(s) Specifying Subpicture Including the Slice

The reason why signaling of the syntax element (a) may be omitted is because, when only one slice is included per picture, it is obvious that no subpicture is specified. For example, when picture_header_in_slice_header_flag indicates that the current picture includes only one slice, since the current picture is not encoded/decoded based on the subpicture, signaling of information on the subpicture may be omitted.

(b) Syntax Element(s) Specifying Address of the Slice

The reason why signaling of the syntax element (b) may be omitted is because it is obvious that the slice is the only first slice in the picture. For example, when picture_header_in_slice_header_fla indicates that the current picture includes only one slice, since the current slice is the only slice in the current picture, signaling of the address for the current slice may be omitted.

Configuration 4

When each picture in the sequence has only one slice, the subpicture is also not used. For example, subpics_present_flag or subpic_info_present_flag, which is a syntax element for the subpicture, may be limited to a second value (e.g., 0 or False). subpics_present_flag or subpic_info_present_flag may specify whether a subpicture is present in the current picture or whether information on a subpicture is present in the bitstream. subpics_present_flag or subpic_info_present_flag may be included and signaled in the sequence parameter set, for example.

Similarly, when subpics_present_flag or subpic_info_present_flag is a first value (e.g., 1 or True), a flag indicating whether each picture in the sequence includes only one slice or a flag (e.g., picture_header_in_slice_header_flag) indicating whether a picture header is present in the slice header may not indicate that the current picture includes only one slice and may not indicate that a picture header is present in the slice header. Accordingly, for example, when subpics_present_flag or subpic_info_present_flag is a first value (e.g., 1 or True), picture_header_in_slice_header_flag may be constrained to have a second value (e.g., 0 or False).

Configuration 5

When a picture header is not present in the picture header NAL unit but is present in the slice header, in a CLVS of a particular layer (layer A), picture headers of all layers that refer to layer A (i.e., dependent layers of layer A) and all layers referred to by layer A may be constrained to be present in slice header, not in the picture header NAL unit. The above constraint is imposed to simplify picture boundary detection within an access unit for multi-layer bitstream case.

FIG. 14 is a view showing the syntax structure of a slice header according to another embodiment of the present disclosure.

Since the description of the same syntax elements and the same signaling conditions are the same in the slice header structure according to the embodiment of FIG. 14 and the slice header structure according to the embodiment of FIG. 11, a repeated description will be omitted.

According to the embodiment of FIG. 14, the condition for signaling slice_subpic_id may be changed. Specifically, the slice header may include slice_subpic_id based on subpics_present_flag and picture_header_in_slice_header_flag. For example, when subpics_present_flag is a first value (e.g., 1 or True) and picture_header_in_slice_header_flag is a second value (e.g., 0 or False), slice_subpic_id may be signaled in the slice header. This is because, as described above, when picture_header_in_slice_header_flag has a first value, the current picture includes only one slice and encoding/decoding based on the subpicture is not performed, signaling of the information on the subpicture is unnecessary.

In addition, according to the embodiment of FIG. 14, the condition for signaling slice_address may be changed. Specifically, the slice header may include slice_address based on rect_slice_flag, NumTilesInPic and picture_header_in_slice_header_flag. For example, when rect_slice_flag is a first value (e.g., 1 or True) or NumTilesInPic is greater than 1, and picture_header_in_slice_header_flag is a second value (e.g., 0 or False), slice_address may be signaled in the slice header. This is because, as described above, when picture_header_in_slice_header_flag has a first value, since the current picture includes only one slice, signaling of the information on the address of the slice is unnecessary.

In the embodiment of FIG. 14, a requirement of bitstream conformance for picture_header_in_slice_header_flag may be improved as follows.

First, it is required that the value of picture_header_in_slice_header_flag is the same in all slices in the CLVS.

In addition, when picture_header_in_slice_header_flag is a first value (e.g., 1), it is required that a NAL unit with NAL unit type equal to PH_NUT is not present in the CLVS. This is because the picture header is included and signaled in the slice header and thus a separate NAL unit for transmitting the picture header is not necessary.

In addition, when picture_header_in_slice_header_flag is a second value (e.g., 0), it is required that a NAL unit with NAL unit type equal to PH_NUT is present in the PU, preceding the first VCL NAL unit of the PU. That is, it is required that the current PU has the PH NAL unit. This is because a separate NAL unit for transmitting the picture header is necessary.

In addition, when subpics_present_flag or subpic_info_present_flag is a first value (e.g., 1), it is required that picture_header_in_slice_header_flag is not a first value (e.g., 1). In this case, picture_header_in_slice_header_flag may be constrained to have a second value (e.g., 0).

In the example of FIG. 14, slice_subpic_id indicates the identifier of the subpicture including the slice. When slice_subpic_id is present, a variable SubPicIdx is derived such that SubpicIdList[SubPicIdx] is equal to slice_subpic_id. When slice_subpic_id is not present, a variable SubPicIdx may be derived to be equal to 0.

In the example of FIG. 14, the length (bit length) of slice_subpic_id may be derived as follows.

If sps_subpic_id_signalling_present_flag is equal to 1, the length of slice_subpic_id is derived to be equal to sps_subpic_id_len_minus1+1. Here, sps_subpic_id_signalling_present_flag may specify whether the identifier of the subpicture is signaled in the sequence parameter set. sps_subpic_id_len_minus1 is the length information of the subpicture identifier and may be included and signaled in the sequence parameter set.

Otherwise (if sps_subpic_id_signalling_present_flag is not 1), if ph_subpic_id_signalling_present_flag is 1, the length of slice_subpic_id may be derived to be equal to ph_subpic_id_len_minus1+1. Here, ph_subpic_id_signalling_present_flag may specify whether the identifier of the subpicture is signaled in the picture header. ph_subpic_id_len_minus1 is the length information of the subpicture identifier and may be included and signaled in the picture header.

Otherwise (if both sps_subpic_id_signalling_present_flag and ph_subpic_id_signalling_present_flag are not 1), if pps_subpic_id_signalling_present_flag is 1, the length of slice_subpic_id may be derived to be equal to pps_subpic_id_len_minus1+1. Here, pps_subpic_id_signalling_present_flag may specify whether the identifier of the subpicture is signaled in the picture parameter set. pps_subpic_id_len_minus1 is the length information of the subpicture identifier and may be included and signaled in the picture parameter set.

Otherwise (if all sps_subpic_id_signalling_present_flag, ph_subpic_id_signalling_present_flag and pps_subpic_id_signalling_present_flag are not 1), the length of slice_subpic_id may be derived to be equal to Ceil (Log 2 (sps_num_subpics_minus1+1)). sps_num_subpics_minus1 is the number of subpictures of each picture in the CLVS and may be included and signaled in the sequence parameter set.

slice_address specifies the slice address of the current slice. When slice_address is not present, the value of slice_address is inferred to be equal to 0.

picture_header_structure( ) may include at least one syntax element included in picture_header_rbsp( ) described with reference to FIG. 10.

Figure 15:
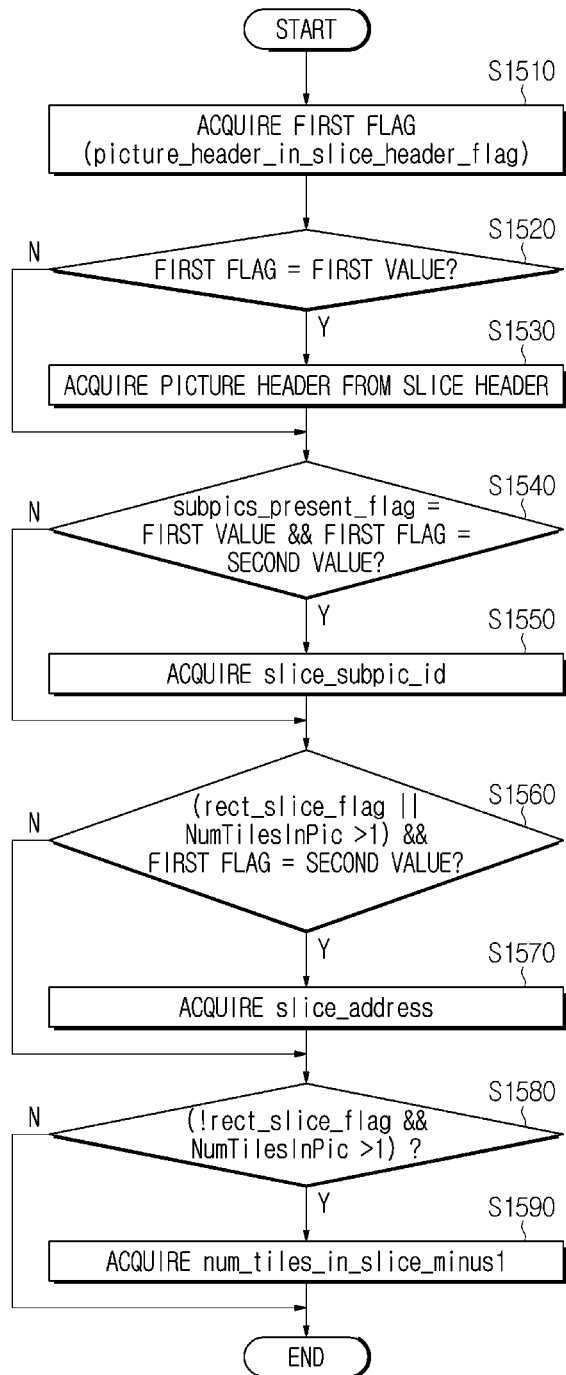
FIG. 15 is a flowchart illustrating a method of parsing and decoding the slice header of FIG. 14.

FIG. 15 is a flowchart illustrating a method of parsing and decoding the slice header of FIG. 14.

Steps S1510 to S1530 of FIG. 15 are equal to steps S1210 to S1230 of FIG. 12, respectively and thus a repeated description thereof will be omitted.

Steps S1540 to S1570 of FIG. 15 may correspond to steps S1240 to S1270 of FIG. 12, respectively. Accordingly, a repeated description of the common portions will be omitted.

According to the embodiment of FIG. 15, in step S1540, it may be determined whether subpics_present_flag is a first value (e.g., 1 or True) and whether a first flag is a second value (e.g., 0 or False).

When subpics_present_flag is a first value and the first flag is a second value (step S1540-Yes), the image decoding apparatus may acquire slice_subpic_id from the slice header (S1550). When subpics_present_flag is a second value (e.g., 0 or False) or the first flag is a first value (e.g., 1 or True) (step S1540-No), the image decoding apparatus may omit (skip) parsing of slice_subpic_id from the slice header.

Thereafter, in step S1560, it may be determined whether rect_slice_flag is a first value (e.g., 1 or True) or whether NumTilesInPic is greater than 1 and whether the first flag is a second value (e.g., 0 or False).

When rect_slice_flag is a first value or NumTilesInPic is greater than 1 and the first flag is a second value (step S1560-Yes), the image decoding apparatus may acquire slice_address from the slice header (S1570). When rect_slice_flag is a second value (e.g., 0 or False) and NumTilesInPic is not greater than 1 or the first flag is a first value (e.g., 1 or True) (step S1560-No), the image decoding apparatus may omit (skip) parsing of slice_address from the slice header.

Steps S1580 to S1590 of FIG. 15 are equal to steps S1280 to S1290 of FIG. 12, respectively and thus a repeated description thereof will be omitted.

As described with reference to FIG. 12, the image decoding apparatus may decode the slice header, by parsing subsequent syntax elements, which are not shown, from the slice header.

Figure 16:
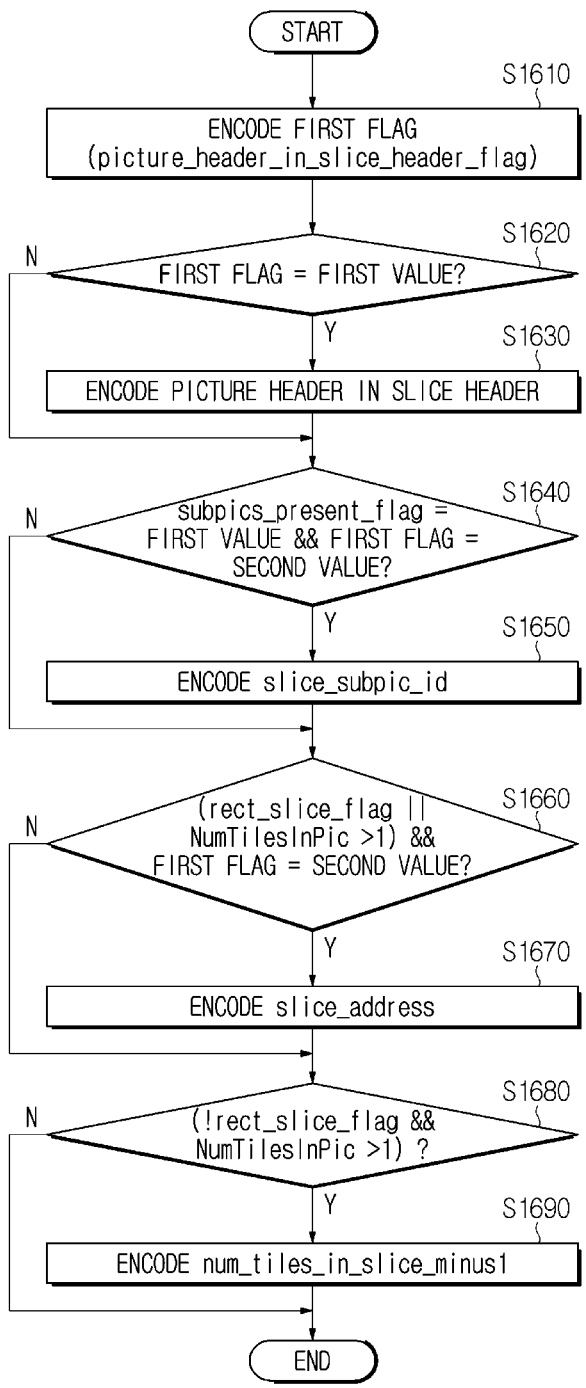
FIG. 16 is a flowchart illustrating a method of encoding the slice header of FIG. 14.

FIG. 16 is a flowchart illustrating a method of encoding the slice header of FIG. 14.

Steps S1610 to S1630 of FIG. 16 are equal to steps S1310 to S1330 of FIG. 13, respectively and thus a repeated description thereof will be omitted.

Steps S1640 to S1670 of FIG. 16 may correspond to steps S1340 to S1370 of FIG. 16, respectively. Accordingly, a repeated description of the common portions will be omitted.

According to the embodiment of FIG. 16, in step S1640, it may be determined whether subpics_present_flag is a first value (e.g., 1 or True) and a first flag is a second value (e.g., 0 or False).

When subpics_present_flag is a first value and the first flag is a second value (step S1640-Yes), the image encoding apparatus may encode slice_subpic_id in the slice header (S1650). When subpics_present_flag is a second value (e.g., 0 or False) or the first flag is a first value (e.g., 1 or True) (step S1640-No), the image encoding apparatus may omit (skip) encoding of slice_subpic_id in the slice header.

Thereafter, in step S1660, it may be determined whether rect_slice_flag is a first value (e.g., 1 or True) or whether NumTilesInPic is greater than 1 and whether a first flag is a second value (e.g., 0 or False).

When rect_slice_flag is a first value or NumTilesInPic is greater than 1 and the first flag is a second value (step S1660-Yes), the image encoding apparatus may encode slice_address in the slice header (S1670). When rect_slice_flag is a second value (e.g., 0 or False) and NumTilesInPic is not greater than 1 or the first flag is a first value (e.g., 1 or True) (step S1660-No), the image encoding apparatus may omit (skip) encoding of slice_address in the slice header.

Steps S1680 to S1690 of FIG. 16 are equal to step S1380 to S1390 of FIG. 13, respectively and thus a repeated description thereof will be omitted.

As described with reference to FIG. 13, the image encoding apparatus may encode the slice header, by encoding subsequent syntax elements, which are not shown, in the slice header.

In the example described with reference to FIGS. 15 and 16, some steps may be changed or omitted. For example, conditions related to encoding/decoding of slice_address and/or num_tiles_in_slice_minus1 may be changed.

As a modified example of the embodiments described with reference to FIGS. 14 to 16, improved constraints on picture_header_in_slice_header_flag are applicable to the embodiment shown in FIG. 11. In this case, at least some of the problems of the conventional methods may be solved. Specifically, for example, the value of picture_header_in_slice_header_flag may be constrained based on information on a subpicture (subpics_present_flag or subpic_info_present_flag) signaled at a higher level of the slice header. More specifically, when subpics_present_flag or subpic_info_present_flag is a first value, picture_header_in_slice_header_flag may be constrained to have a second value. Accordingly, when subpics_present_flag (or subpic_info_present_flag) is a first value (when information on a subpicture is present in a bitstream or the current picture includes a subpicture), picture_header_in_slice_header_flag may indicate that a picture header is not present in the slice header or the current picture does not include only one slice. In the embodiment shown in FIG. 14, when subpics_present_flag is a first value and picture_header_in_slice_header_flag is a second value, slice_subpic_id may be acquired from the slice header. However, when subpics_present_flag is a first value, since picture_header_in_slice_header_flag is constrained to have a second value, it may be sufficient to check subpics_present_flag as the parsing condition of slice_subpic_id. That is, according to this modified example, in step S1540 and step S1640, a determination as to whether the first flag is a second value may be omitted. According to this modified example, the image encoding apparatus may encode picture_header_in_slice_header_flag having a second value when subpics_present_flag or subpic_info_present_flag is a first value. In addition, the image decoding apparatus may acquire picture_header_in_slice_header_flag having a second value when subpics_present_flag or subpic_info_present_flag is a first value.

FIG. 17 is a view showing the syntax structure of a slice header according to another embodiment of the present disclosure.

Since the description of the same syntax elements and the same signaling conditions are the same in the slice header structure according to the embodiment of FIG. 17 and the slice header structure according to the embodiment of FIG. 14, a repeated description will be omitted.

According to the embodiment of FIG. 17, the condition for signaling picture_header_in_slice_header_flag may be changed. Specifically, the slice header may include picture_header_in_slice_header_flag based on subpics_present_flag. For example, when subpics_present_flag is a first value (e.g., 1 or True), picture_header_in_slice_header_flag may not be signaled in the slice header. For example, when subpics_present_flag is a second value (e.g., 0 or False), picture_header_in_slice_header_flag may be signaled in the slice header. This is because, as described above, when subpics_present_flag has a first value, since the current picture cannot contain only one slice, picture_header_in_slice_header_flag has a fixed value (second value). Accordingly, signaling of picture_header_in_slice_header_flag is unnecessary. In this case, a picture header which is signaled in case picture_header_in_slice_header_flag is a first value may not be signaled through the slice header.

In addition, according to the embodiment of FIG. 17, when subpics_present_flag is a first value, slice_subpic_id may be signaled in the slice header.

Hereinafter, for description of slice_address and num_tiles_in_slice_minus1, refer to FIG. 14.

In the embodiment of FIG. 17, a requirement of bitstream conformance for picture_header_in_slice_header_flag may be the same as those described with reference to FIG. 14.

Figure 18:
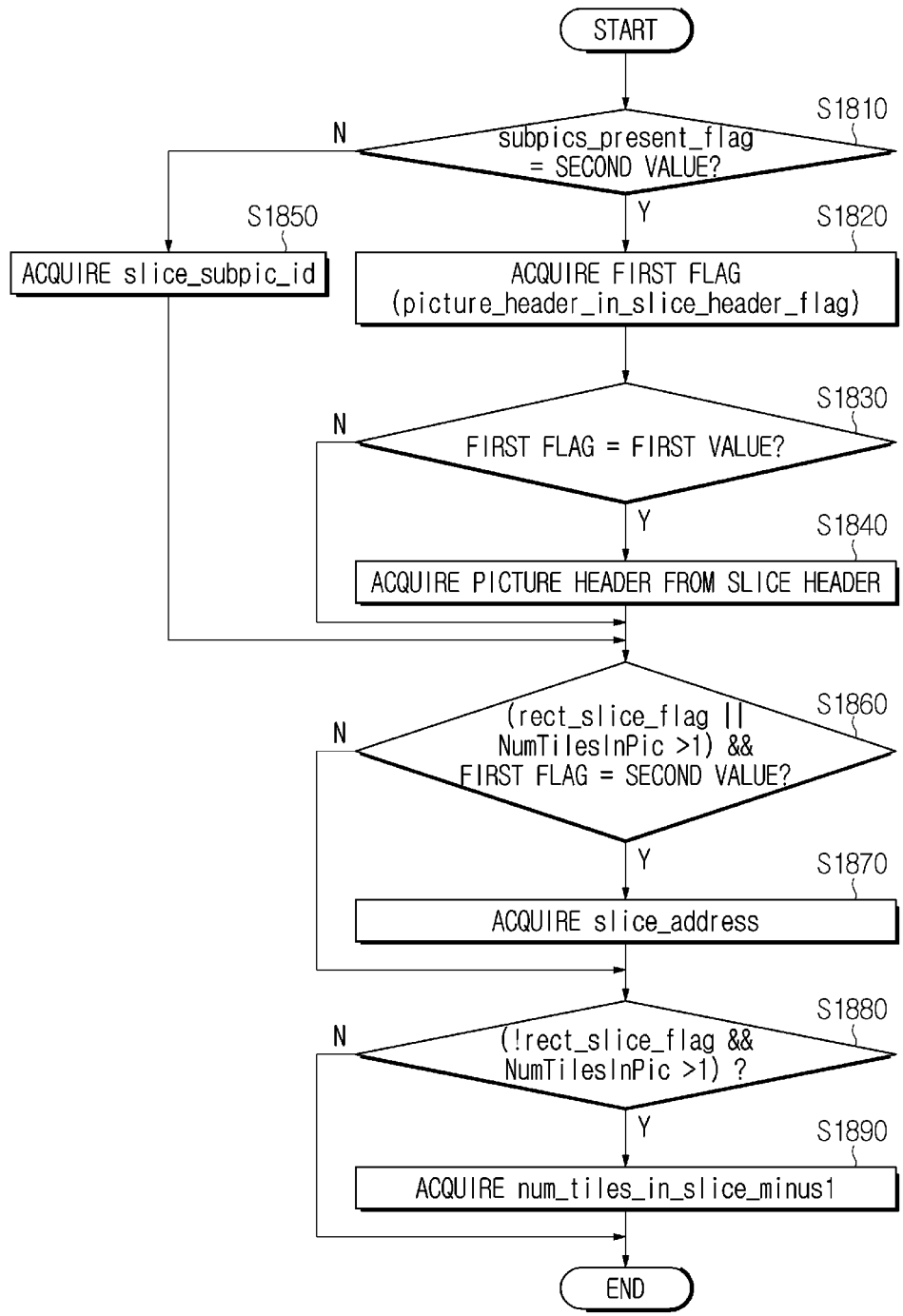
FIG. 18 is a flowchart illustrating a method of parsing and decoding the slice header of FIG. 17.

FIG. 18 is a flowchart illustrating a method of parsing and decoding the slice header of FIG. 17.

The method according to FIG. 18 and the method according to FIG. 15 are different in some conditions and order for parsing the syntax element, and the description of the syntax elements which are commonly disclosed may be the same.

According to the embodiment of FIG. 18, the image decoding apparatus may determine whether the value of subpics_present_flag is a second value (e.g., 0 or False) in step S1810.

When the value of subpics_present_flag is a first value (e.g., 1 or True) in step S1810, since encoding/decoding based on the subpicture is performed, the current picture does not include only one slice. Accordingly, in this case, the image decoding apparatus may not acquire picture_header_in_slice_header_flag and a picture header from the slice header but may acquire slice_subpic_id (S1850).

When the value of subpics_present_flag is a second value in step S1810, the image decoding apparatus acquires a first flag (picture_header_in_slice_header_flag) from the slice header (S1820). The image decoding apparatus may determine whether the first flag is a first value (S1830), and acquire a picture header from the slice header when the first flag is a first value (S1840). When the first flag is a second value, the image decoding apparatus does not acquire the picture header from the slice header, and, in this case, the image decoding apparatus may acquire the picture header through a separate NAL unit. When the value of subpics_present_flag is a second value in step S1810, since encoding/decoding based on the subpicture is not performed, the image decoding apparatus may not acquire information on a subpicture (slice_subpic_id).

Steps S1860 to S1890 of FIG. 18 are equal to step S1560 to S1590 of FIG. 15, respectively and thus a repeated description thereof will be omitted.

As described with reference to FIG. 12, the image decoding apparatus may decode the slice header, by parsing subsequent syntax elements, which are not shown, from the slice header.

Figure 19:
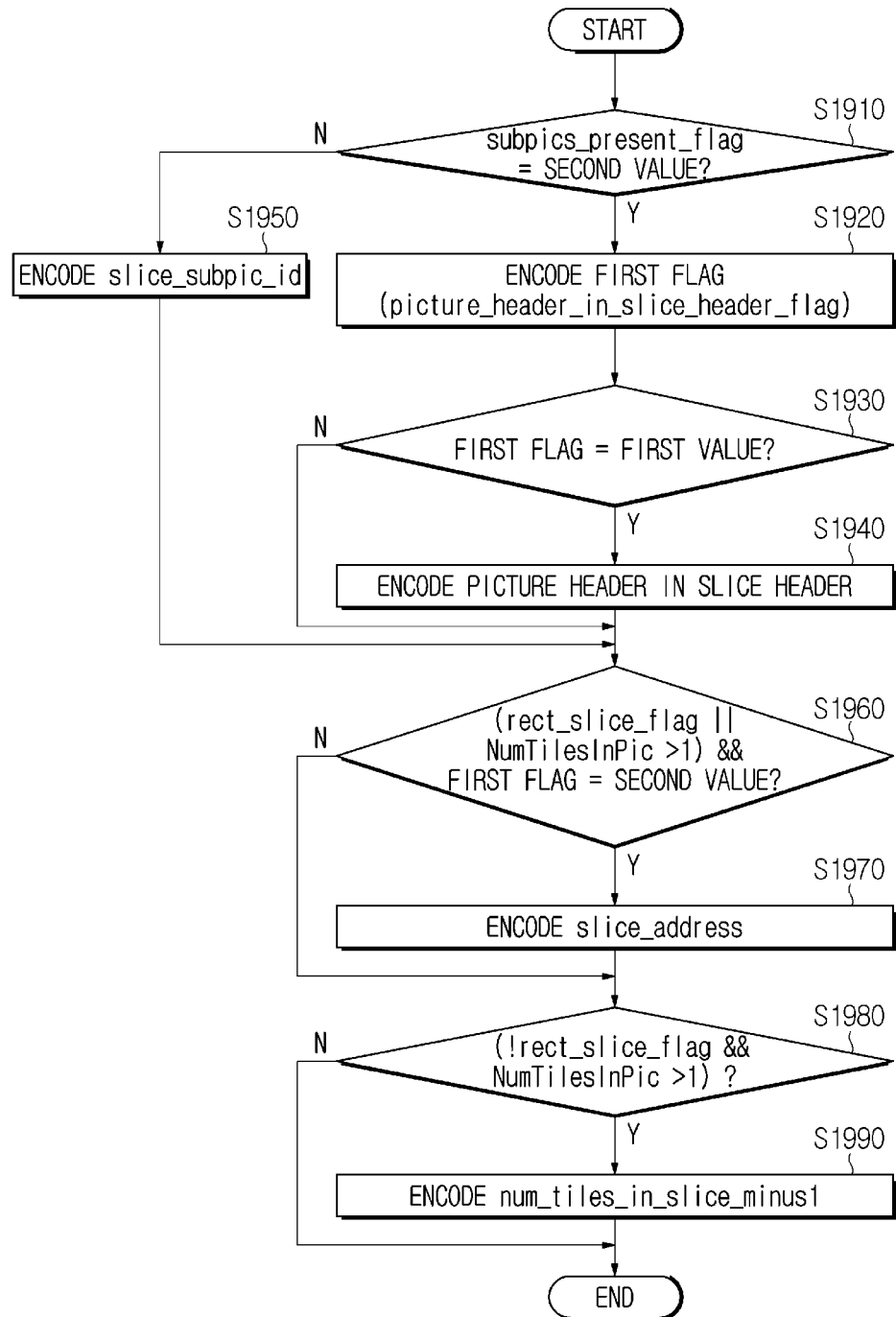
FIG. 19 is a flowchart illustrating a method of encoding the slice header of FIG. 17.

FIG. 19 is a flowchart illustrating a method of encoding the slice header of FIG. 17.

The method according to FIG. 19 and the method according to FIG. 16 are different in some conditions and order for encoding the syntax element, and the description of the syntax elements which are commonly disclosed may be the same.

According to the embodiment of FIG. 19, the image encoding apparatus may determine whether the value of subpics_present_flag is a second value (e.g., 0 or False) in step S1910.

When the value of subpics_present_flag is a first value (e.g., 1 or True) in step S1910, since encoding/decoding based on a subpicture is performed, the current picture does not include only one slice. Accordingly, in this case, the image encoding apparatus may not encode picture_header_in_slice_header_flag and a picture header in the slice header but may encode slice_subpic_id (S1950).

When the value of subpics_present_flag is a second value in step S1910, the image encoding apparatus may determine the value of a first flag (picture_header_in_slice_header_flag) and encode the first flag in the slice header (S1920). The image encoding apparatus may determine whether the first flag is a first value (S1930), and encode a picture header in the slice header when the first flag is a first value (S1940). When the first flag is a second value, the image encoding apparatus may not encode the picture header in the slice header, and, in this case, the image encoding apparatus may signal the picture header through a separate NAL unit. When the value of subpics_present_flag is a second value in step S1910, since encoding/decoding based on a subpicture is not performed, the image encoding apparatus may not encode information on a subpicture (slice_subpic_id) in the slice header.

Steps S1960 to S1990 of FIG. 19 are equal to step S1660 to S1690 of FIG. 16, respectively and thus a repeated description thereof will be omitted.

As described with reference to FIG. 13, the image encoding apparatus may encode the slice header, by encoding subsequent syntax elements, which are not shown, in the slice header.

In the examples described with reference to FIGS. 18 and 19, some steps may be changed or omitted. For example, conditions related to encoding/decoding of slice_address and/or num_tiles_in_slice_minus1 may be changed.

According to the embodiment of the present disclosure, it is possible to more efficiently signal information on whether a picture header is present in a slice header and/or information on whether a picture includes only one slice.

In addition, according to the embodiment of the present disclosure, since the information on whether the picture header is present in the slice header is signaled based on whether encoding/decoding based on a subpicture is performed, it is possible to prevent unnecessary information from being signaled.

The names of the syntax elements described in the present disclosure may include information on a location where the corresponding syntax element is signaled. For example, a syntax element starting with "sps_" may mean that the corresponding syntax element is signaled in a sequence parameter set (SPS). In addition, syntax elements starting with "pps_", "ph_", "sh_", etc. mean that the corresponding syntax elements are respectively signaled in a picture parameter set (PPS), a picture header and a slice header.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 20:
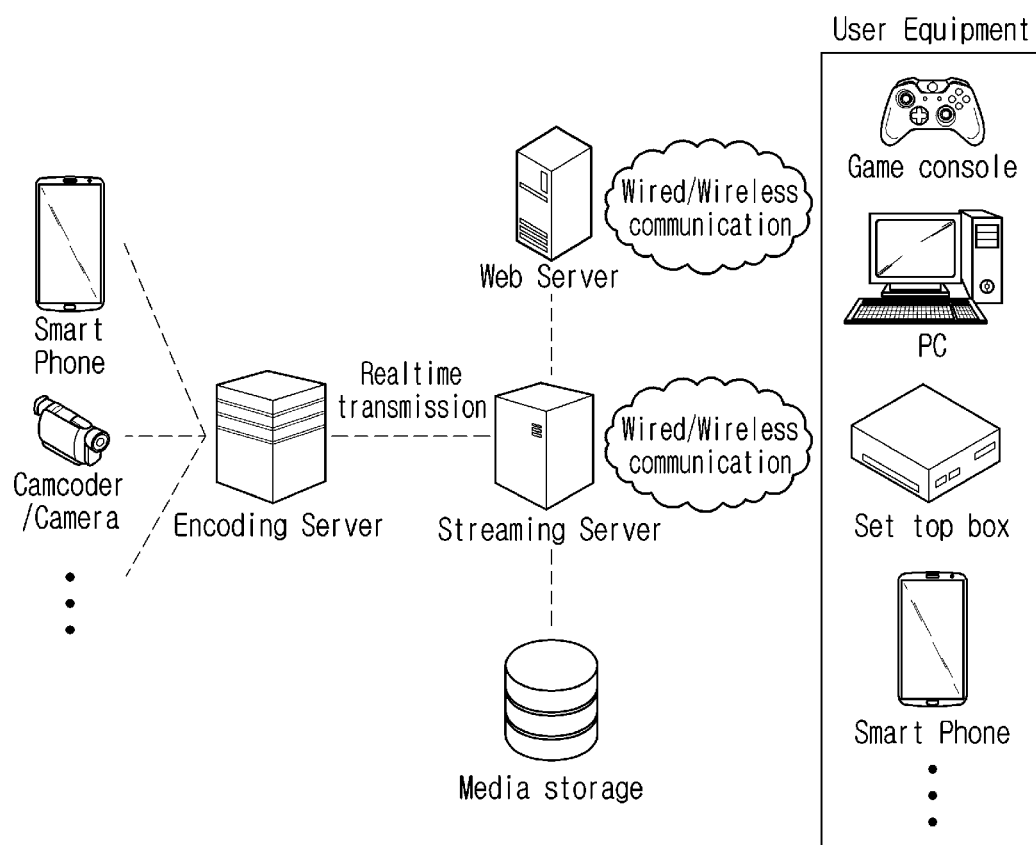
FIG. 20 is a view showing a content streaming system, to which an embodiment of the present disclosure is applicable.

FIG. 20 is a view showing a content streaming system, to which an embodiment of the present disclosure is applicable.

As shown in FIG. 20, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content are received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

What is claimed is:

1. An image decoding apparatus comprising:
a memory; and
at least one processor connected to the memory, the at least one processor configured to:
acquire a first flag specifying whether information on a subpicture is present in a bitstream;
acquire a second flag specifying whether picture header information is present in a slice header; and
decode the bitstream based on the first flag and the second flag,
wherein, based on the first flag specifying that the information on the subpicture is present in the bitstream, the second flag is restricted to have a value specifying that the picture header information is not present in the slice header.

2. The image decoding apparatus of claim 1,
wherein, based on the first flag specifying that the information on the subpicture is present in the bitstream, the slice header includes an identifier of a subpicture including a slice related to the slice header.

3. The image decoding apparatus of claim 1, further comprising
acquire the picture header information from the slice header based on the second flag specifying that the picture header information is present in the slice header.

4. The image decoding apparatus of claim 1,
wherein the second flag has the same value with respect to all slices in a coded layer video sequence (CLVS).

5. The image decoding apparatus of claim 1,
wherein, based on the second flag specifying that the picture header information is present in the slice header, a network abstraction layer (NAL) unit for transmitting the picture header information is not present in a coded layer video sequence (CLVS).

6. The image decoding apparatus of claim 1,
wherein, based on the second flag specifying that the picture header information is not present in the slice header, the picture header information is acquired from a network abstraction layer (NAL) unit with an NAL unit type equal to PH_NUT.

7. The image decoding apparatus of claim 1,
wherein the first flag is signaled at a higher level of a slice, and
wherein the second flag is included and signaled in the slice header.

8. An image encoding apparatus comprising:
a memory; and
at least one processor connected to the memory, the at least one processor configured to:
encode a first flag specifying whether information on a subpicture is present in a bitstream;
encode a second flag specifying whether picture header information is present in a slice header; and
encode the bitstream based on the first flag and the second flag,
wherein, based on the first flag specifying that the information on the subpicture is present in the bitstream, the second flag is restricted to have a value specifying that the picture header information is not present in the slice header.

9. The image encoding apparatus of claim 8,
wherein, based on the first flag specifying that the information on the subpicture is present in the bitstream, the slice header includes an identifier of a subpicture including a slice related to the slice header.

10. The image encoding apparatus of claim 8, further comprising
encode the picture header information in the slice header based on the second flag specifying that the picture header information is present in the slice header.

11. The image encoding apparatus of claim 8,
wherein the second flag has the same value with respect to all slices in a coded layer video sequence (CLVS).

12. The image encoding apparatus of claim 8,
wherein, based on the second flag specifying that the picture header information is not present in the slice header, the picture header information is signaled through a network abstraction layer (NAL) unit with an NAL unit type equal to PH_NUT.

13. The image encoding apparatus of claim 8,
wherein the first flag is signaled at a higher level of a slice, and
wherein the second flag is included and signaled in the slice header.

14. An apparatus for transmitting a bitstream, the apparatus comprising:
at least one processor configured to obtain the bitstream generated by an encoding apparatus; and
a transmitter configured to transmit the bitstream;
the bitstream generated by:
encoding a first flag specifying whether information on a subpicture is present in a bitstream;
encoding a second flag specifying whether picture header information is present in a slice header; and
encoding the bitstream based on the first flag and the second flag,
wherein, based on the first flag specifying that the information on the subpicture is present in the bitstream, the second flag is restricted to have a value specifying that the picture header information is not present in the slice header.

* * * * *